United States Patent
Schmalstieg et al.

(10) Patent No.: US 6,626,988 B1
(45) Date of Patent: Sep. 30, 2003

(54) PHOSPHATE-STABILIZED POLYURETHANE MATERIALS, CROSS-LINKED BY CONDENSATION, METHOD FOR THEIR PRODUCTION AND USE THEREOF

(75) Inventors: Lutz Schmalstieg, Köln (DE); Ralf Lemmerz, Leverkusen (DE); Ulrich Walter, deceased, late of Langenfeld (DE), by Marie-Hélène Marie-Ange Christiane Walter, heir; Alexander Eckhardt, Köln (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/980,941
(22) PCT Filed: May 9, 2000
(86) PCT No.: PCT/EP00/04132
§ 371 (c)(1), (2), (4) Date: Nov. 15, 2001
(87) PCT Pub. No.: WO00/71595
PCT Pub. Date: Nov. 30, 2000

(30) Foreign Application Priority Data

May 21, 1999 (DE) .................................. 199 23 300

(51) Int. Cl.$^7$ ............................................. C09D 175/04
(52) U.S. Cl. ................ 106/287.25; 528/65; 528/38; 528/25; 528/28; 528/41; 556/413; 556/418; 558/70; 568/8; 524/127; 524/589

(58) Field of Search ............................ 528/65, 38, 25, 528/28, 41; 556/413, 418; 558/70; 568/8; 524/127, 589; 106/287.25

(56) References Cited

U.S. PATENT DOCUMENTS

| | | | |
|---|---|---|---|
| 4,361,692 A | | 11/1982 | Ammons ..................... 528/51 |
| 5,364,955 A | * | 11/1994 | Zwiener et al. |
| 5,756,751 A | | 5/1998 | Schmalstieg et al. ....... 548/110 |

FOREIGN PATENT DOCUMENTS

| | | |
|---|---|---|
| DE | 19 507 416 | 9/1996 |
| EP | 353 551 | 2/1990 |
| EP | 596 360 | 5/1994 |
| EP | 608 888 | 8/1994 |
| EP | 0 676 403 | 10/1995 |
| EP | 831 108 | 3/1998 |

OTHER PUBLICATIONS

Hackh's Chemical Dictionary, 4$^{th}$ Ed., edited by Julius Grant, McGraw–Hill, 1969, paged 477 and 515.*

* cited by examiner

Primary Examiner—Robert Dawson
Assistant Examiner—Kuo-Liang Peng
(74) Attorney, Agent, or Firm—Joseph C. Gil; Thomas W. Roy

(57) ABSTRACT

The invention relates to polyurethane materials, cross-linked by silane polycondensation, containing alkoxylsilane functional polyurethanes, alkaline fillers, phosphorous compounds aminosilanes, organometallic compounds and optionally additional auxiliary agents, to a method for their production and to the use thereof.

10 Claims, No Drawings

PHOSPHATE-STABILIZED POLYURETHANE MATERIALS, CROSS-LINKED BY CONDENSATION, METHOD FOR THEIR PRODUCTION AND USE THEREOF

BACKGROUND OF THE INVENTION

This invention relates to polyurethane compositions which crosslink via silane polycondensation and which comprise alkoxysilane-functional polyurethanes, basic fillers, phosphorus compounds, aminosilanes, organometallic compounds and optionally other adjuvant substances, to a method of producing them and to their use.

Alkoxysilane-functional polyurethanes which crosslink via silane polycondensation form part of the prior art which has long been known. A review article on this topic is given in "Adhesives Age" April 1995, page 30 et seq. (authors: Ta-Min Feng, B. A. Waldmann). Single-component polyurethanes of this type, which contain terminal alkoxysilane groups and which cure under the effect of moisture, are increasingly being used as flexible coating, sealing and adhesive compositions in the building trade and in the automobile industry. In these applications, stringent demands are made on the capacity of these compositions for dilatation and adhesion and on the rate of curing thereof, for example.

Products of this type are described in EP-A-596 360, EP-A 831 108, EP-A 807 649 and EP-A 676 403, for example. Organometallic catalysts, as well as bonding agents of the aminosilane type, are typically used in conjunction when formulating systems of this type. However, the addition of aminosilane compounds often results in problems of stability on storage, particularly if higher proportions of aminosilanes are used in order to achieve good adhesion to difficult substrates.

The object of the present invention was therefore to provide polyurethane compositions which contain aminosilanes and which crosslink via silane polycondensation, and which exhibit improved stability on storage.

It has proved possible to achieve this object by the provision of the polyurethane compositions which crosslink by condensation and which are described in more detail below.

SUMMARY OF THE INVENTION

The present invention relates to polyurethane compositions which crosslink via silane polycondensation, comprising A) at least one alkoxysilane-functional polyurethane containing terminal groups of general formula (I)

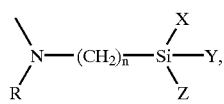

(I)

wherein
R represents an organic radical comprising 1 to 12 carbon atoms,
n represents the numbers 2, 3 or 4, and
X, Y, Z constitute identical or different organic radicals, with the proviso that at least one of the radicals constitutes an alkoxy group comprising 1 to 4 carbon atoms, preferably a methoxy or an ethoxy group, B) at least one basic filler,
C) at least one phosphorus compound from the group comprising esters of orthophosphoric acid and/or an ester or polyphosphoric acid of general formula (II)

wherein
m represents the numbers 1 or 2,
R' represents a linear or branched $C_1$–$C_{30}$ alkyl, acyl, $C_2$–$C_{30}$ alkenyl, alkoxyalkyl, $C_5$–$C_{14}$ cycloalkyl or aryl radical, which is optionally substituted, or a triorganosilyl or diorganoalkoxysilyl radical, which can be the same or different within the molecule, D) at least one aminosilane of general formula (III)

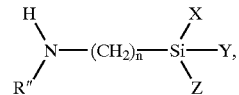

(III)

wherein
R" represents a hydrogen atom, an aliphatic hydrocarbon radical comprising 1 to 4 carbon atoms, a trialkoxysilylpropyl group or an aminoethyl group, and n, X, Y, and Z have the meanings given for formula (I), E) organometallic compounds, and
F) optionally other adjuvant substances.

DETAILED DESCRIPTION OF THE INVENTION

The use of organic phosphorus compounds for stabilising silicone sealing material systems, namely RTV 1 systems, is known from DE-A 19 507 416, for example. According to the teaching of the aforementioned patent, the addition of organophosphorus compounds improves the stability on storage of RTV 1 systems. In these systems, depolymerisation is prevented by the addition of said organophosphorus compounds. Of course, depolymerisation cannot occur at all in polyurethanes which comprise alkoxysilane terminal groups. In view of this fact, it is extremely surprising that the organophosphorus compounds according to the invention also have a positive effect on the stability on storage of polyurethane systems which crosslink via silane polycondensation.

Polyurethanes A) which contain alkoxysilane terminal groups are known in principle and are produced by the reaction of long-chain, preferably linear NCO prepolymers with amino-functional silanes of general formula (Ia),

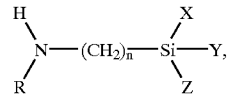

(Ia)

wherein
R represents an organic radical comprising 1 to 12 carbon atoms, preferably a phenyl group, or represents a radical of general structural formula (Ib)

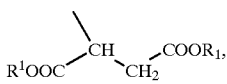
(Ib)

wherein

R$_1$ represents an alkyl group comprising 1 to 4 carbon atoms.

R most preferably represents a radical of general structural formula (II), wherein R$_1$ has the meaning given above.

In the above structural formula, n represents the number 2, 3 or 4, preferably 3.

X, Y and Z in the above structural formula denote identical or different organic radicals, with the proviso that at least one of the radicals constitutes an alkoxy group comprising 1 to 4 carbon atoms. At least one of the radicals is preferably a methoxy or ethoxy group. X, Y and Z most preferably each represent a methoxy group. Examples of suitable amino-functional silanes include N-methyl-3-aminopropyltrimethoxysilane, N-methyl-3-aminopropyltriethoxysilane and N-butyl-3-aminopropyl-trimethoxysilane. N-phenyl-3-aminopropyltrimethoxysilane is preferably used.

The esters of aspartic acid which are described in EP-A 596360 are most preferably used. These are produced by the reaction of aminosilanes of general structural formula (Ia) with esters of maleic or fumaric acid, of formula (IV):

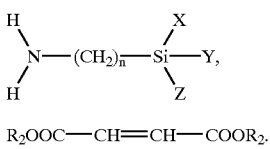
(Ia)

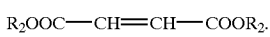
(IV)

In formula (Ia), n, X, Y and Z have the meanings given above for formula (I). In formula (IV), R$_2$ represents an alkyl radical comprising 1 to 4 carbon atoms.

The NCO prepolymers which can be used for the production of polyurethanes A) which contain alkoxysilane terminal groups are produced in the known manner by the reaction of polyether polyols, preferably polyether diols, with diisocyanates, and have an NCO content between 0.4 and 4%.

The basic fillers B) which can be used according to the invention include precipitated or ground chalk, metal oxides, sulphates, silicates, hydroxides, carbonates and hydrogen carbonates. Examples of other fillers include reinforcing and non-reinforcing fillers, such as pyrogenic or precipitated hydrated silicas, carbon black or quartz powder. Both the basic fillers and the other reinforcing or non-reinforcing fillers may optionally be present in surface-modified form. Precipitated or ground chalk and pyrogenic hydrated silicas, the surfaces of which may optionally be treated, are preferably used as basic fillers B). Component B) may also of course comprise mixtures of fillers.

Phosphorus compounds C) according to the invention are esters of orthophosphoric acid and phosphoric acid or mixtures thereof. The esters of orthophosphoric acid correspond to the following general formula (II):

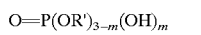
(II), wherein m represents the numbers 1 or 2, and

R' represents a linear or branched C$_1$–C$_{30}$ alkyl, acyl, C$_2$–C$_{30}$ alkenyl, alkoxyalkyl, C$_5$–C$_{14}$ cycloalkyl or aryl radical, which is optionally substituted, or a triorganosilyl or diorganoalkoxysilyl radical, and R' can be the same or different within the molecule.

In one preferred embodiment of the present invention, phosphorus compound C) is an ester of orthophosphoric acid comprising at least one optionally substituted linear or branched C$_4$–C$_{30}$ alkyl radical R'. Examples of esters of phosphoric acid C) according to the invention include primary and secondary esters of orthophosphoric acid and mixtures thereof, such as di-(2-ethylhexyl) phosphate, dihexadecyl phosphate, diisononyl phosphate, mono-isodecyl phosphate and mono-(2-ethylhexyl) phosphate. Component C) can also be an ester of polyphosphoric acid or a mixture of a plurality of esters of polyphosphoric acid. Salts of ortho- and polyphosphoric acid esters are also suitable, such as alkali metal salts for example.

The aminosilane compounds which are known in the art, of general structural formula (III)

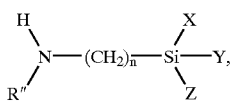
(III)

are used as component D), wherein

R" represents a hydrogen atom, an aliphatic hydrocarbon radical comprising 1 to 4 carbon atoms, a trialkoxysi-lylpropyl group or an aminoethyl group, and n, X, Y, and Z have the meanings given above.

Examples of aminosilane compounds which can be used include 3-aminopropyltrimethoxysilane, 3-aminopropyltriethoxysilane, N-methyl-3-aminopropyltrimethoxysilane, N-aminoethyl-3-aminopropyltrimethoxysilane, N-aminoethyl-3-aminopropyltriethoxysilane, 3-aminopropyl-methyl-diethoxysilane, N,N-bis-trimethoxysilylpropyl-amine and N-aminoethyl-3-aminopropylmethyldimethoxysilane.

All organometallic catalysts which are known to promote silane polycondensation can be used as component E). In particular, these include compounds of tin and titanium. Examples of preferred tin compounds include dibutyltin dilaurate, dibutyltin diacetate and dioctyl tin maleate, tin(II) octoate and dibutyltin bis-acetoacetonate. Examples of preferred titanium compounds include alkyl titanates, such as tetraisopropyl titanate and tetrabutyl titanate, and chelated titanium compounds, such as diisobutyl-bis (ethylacetoacetate)-titanate. Dibutyltin bis-acetoacetonate is most preferably used as component E).

Additives and adjuvant substances F) in the sense of the present invention include: drying agents, light stabilisers, plasticisers, bonding agents other than those cited under D), thixotropy-imparting agents, pigments and fungicides.

Drying agents which are particularly suitable include alkoxysilyl compounds such as vinyltrimethoxysilane, methyltrimethoxysilane, i-butyltrimethoxysilane and hexa-decyltrimethoxysilane. Examples of plasticisers include phthalic acid esters, adipic acid esters, alkylsulphonic acid esters of phenols and esters of phosphoric acid.

Examples of thixotropy-imparting agents include polyamides, hydrogenated derivatives of castor oil, and polyvinyl chloride. Epoxysilanes and/or mercaptosilanes can be used as bonding agents in addition to the compounds cited under D).

The polyurethane compositions according to the invention preferably consist of 30 to 80% by weight of component A), 10 to 50% by weight of component B), 0.5 to 5% by weight of component C), 0.5 to 3% by weight of component D), 0.02 to 1% by weight of component E), and of 0 to 40% by weight of component F).

The present invention also relates to a method of producing the polyurethane compositions which crosslink by condensation according to the invention, characterised in that components A), B), C), E), and optionally F), are mixed with the exclusion of moisture and are subsequently treated with component D).

The present invention also relates to the use of the polyurethane compositions which crosslink by condensation according to the invention as a sealing material, adhesive material or coating material.

The polyurethane compositions which crosslink by condensation according to the invention firstly exhibit rapid curing, with skin formation times between 15 and 120 minutes, and secondly exhibit outstanding stability on storage within the temperature range up to 60° C. The crosslinked polymers are distinguished by their excellent mechanical properties and outstanding adhesion, particularly by their wet adhesion to all conceivable substrates, such as metals, ceramics, plastics, masonry or concrete for example.

EXAMPLES

Example 1
Production of a Polyurethane Comprising Alkoxysilyl Terminal Groups 2000 g of a polyether diol with an OH number of 28, prepared by the propoxylation of propylene glycol and subsequent ethoxylation of the propoxylation product (PO/EO ratio 80:20) were prepolymerised with 155.4 g isophorone diisocyanate at 70° C. with the addition of 0.02 g dibutyltin dilaurate until the theoretical NCO content of 0.78% was reached. After cooling to 60° C., 140.4 g N-(3-trimethoxysilylpropyl)-aspartic acid diethyl ester (prepared according to EP-A 596 360, Example 5) were rapidly added drop-wise thereto, and the batch was stirred until the isocyanate band was no longer visible in the IR spectrum. The polyurethane prepolymer which was obtained, which comprised alkoxysilyl terminal groups, had a viscosity of 76,000 mPas (23° C.).

Example 2
Production of a Polyurethane Comprising Alkoxysilyl Terminal Groups 2000 g of a polyether diol with an OH number of 28, prepared by the propoxylation of propylene glycol and subsequent ethoxylation of the propoxylation product (PO/EO ratio 80:20) were prepolymerised with 155.4 g isophorone diisocyanate at 70° C. with the addition of 0.02 g dibutyltin dilaurate until the theoretical NCO content of 0.78% was reached. After cooling to 60° C., 102 g N-phenyl-3-aminopropyltrimethoxysilane were rapidly added drop-wise thereto, and the batch was stirred until the isocyanate band was no longer visible in the IR spectrum. The polyurethane prepolymer which was obtained, which comprised alkoxysilyl terminal groups, had a viscosity of 86,000 mPas (23° C.).

Example 3
Production of a Polyurethane Composition According to the Invention

The following components were processed in a commercially available planetary mixer to produce a ready-to-use sealing material.

| | |
|---|---|
| 36.4 parts by weight | polyurethane from Example 1 |
| 12.9 parts by weight | diisoundecyl phthalate (plasticiser) |
| 0.02 parts by weight | dibutyltin bis-acetoacetonate (10% solution in solvent naphtha ® 100) |
| 1.50 parts by weight | vinyltrimethoxysilane |
| 46.2 parts by weight | precipitated chalk (Type: Socal ® U1S2 manufactured by Solvay GmbH) |
| 2.00 parts by weight | di-2-ethylhexyl phosphate |
| 1.40 parts by weight | Disparlon ® NVG 8403 S (a thixotropy-imparting agent manufactured by Kusumoto Chem. Ltd.) |

The mixture was dispersed for 10 minutes under a pressure of 100 mbar, whereupon the internal temperature rose to 60° C. 1.5 parts by weight N-aminoethyl-3-aminopropyl-trimethoxysilane were subsequently added and were incorporated by stirring for 10 minutes under a pressure of 100 mbar. The sealing material which was thus produced exhibited excellent stability, adhered to almost all substrates and cured with a skin formation time of 30 minutes.

The product was introduced into a commercially available cartridge and stored at 50° C. After a period of storage of 90 days, the product could still be processed without problems, and the properties of the product were unchanged.

Example 4
Production of a Polyurethane Composition According to the Invention

The following components were processed in a commercially available planetary mixer to produce a ready-to-use sealing material.

| | |
|---|---|
| 36.0 parts by weight | polyurethane from Example 2 |
| 12.6 parts by weight | diisoundecyl phthalate (plasticiser) |
| 0.02 parts by weight | dibutyltin bis-acetoacetonate (10% solution in solvent naphtha ® 100) |
| 2.20 parts by weight | vinyltrimethoxysilane |
| 45.68 parts by weight | precipitated chalk (Type: Socal ® U1S2 manufactured by Solvay GmbH) |
| 2.5 parts by weight | mono-2-ethylhexyl phosphate |
| 1.4 parts by weight | Cabosil ® TS 720 (a pyrogenic hydrated silica manufactured by Cabot GmbH) |

The mixture was dispersed for 10 minutes under a pressure of 100 mbar, whereupon the internal temperature rose to 60° C. 2.1 parts by weight N-aminoethyl-3-aminopropyl-trimethoxysilane were subsequently added and were incorporated by stirring for 10 minutes under a pressure of 100 mbar. The sealing material which was thus produced exhibited excellent stability, adhered to almost all substrates and cured with a skin formation time of 40 minutes.

The product was introduced into a commercially available cartridge and stored at 50° C. After a period of storage of 90 days, the product could still be processed without problems, and the properties of the product were unchanged.

Example 5

Example 3 was repeated, except that no di-2-ethylhexyl phosphate was added. The product was introduced into a commercially available cartridge and stored at 50° C. After a period of storage of 22 days, the product could not longer be pressed out of the cartridge and had gelled.

Example 6

Example 4 was repeated, except that no mono-2-ethylhexyl phosphate was added. The product was introduced into a commercially available cartridge and stored at 50° C. After a period of storage of 25 days, the product could no longer be pressed out of the cartridge and had gelled.

What is claimed is:

1. A polyurethane composition, which crosslinks via silane polycondensation, comprising A) at least one alkoxysilane-functional polyurethane containing terminal groups corresponding to formula (I)

$$\begin{array}{c} \diagdown \\ \phantom{xx}N-(CH_2)_{\overline{n}}-Si-Y, \\ \diagup \phantom{xxxxxxxxx} \diagdown \\ R \phantom{xxxxxxxxxxxx} Z \end{array} \quad (I)$$

wherein

R represents an organic radical containing 1 to 12 carbon atoms, n is 2, 3 or 4, and X, Y, Z represent identical or different organic radicals, provided that at least one of the radicals represents an alkoxy group containing 1 to 4 carbon atoms, B) at least one basic filler, C) at least one phosphorus compound comprising a member selected from the group consisting of:

i) an ester of an orthophosphoric acid of the formula (II)

$$O = P(OR')_{3-m}(OH)_m \quad (II)$$

wherein m is one or two, and

R' represents a linear or branched $C_1$–$C_{30}$ alkyl, acyl, $C_2$–$C_{30}$ alkenyl, alkoxyalkyl, $C_5$–$C_{14}$ cycloalkyl or aryl radical, which is optionally substituted, or a triorganosilyl or diorganoalkoxysilyl radical, wherein R' can be the same or different within the molecule ii) an ester of a polyphosphoric acid, iii) a salt of component i), iv) a salt of component ii), and v) mixtures thereof, D) at least one aminosilane corresponding to formula (III)

$$\begin{array}{c} H \phantom{xxxxxxxxxxx} X \\ \diagdown \phantom{xxxxxxxxx} \diagup \\ \phantom{xx}N-(CH_2)_{\overline{n}}-Si-Y, \\ \diagup \phantom{xxxxxxxxx} \diagdown \\ R'' \phantom{xxxxxxxxxx} Z \end{array} \quad (III)$$

wherein

R" represents a hydrogen atom, an aliphatic hydrocarbon radical containing 1 to 4 carbon atoms, a trialkoxysilyl propyl group or an aminoethyl group, n is 2, 3 or 4, and X, Y, Z represent identical or different organic radicals, provided that at least one of the radicals represents an alkoxy group containing 1 to 4 carbon atoms, and E) an organometallic compound.

2. The polyurethane composition of claim 1 wherein component A comprises an alkoxysilane-functional polyurethane containing terminal groups corresponding to formula (I) wherein R represents a radical corresponding to formula (Ib)

$$\begin{array}{c} H \phantom{xxxxxxxxxxx} X \\ \diagdown \phantom{xxxxxxxxx} \diagup \\ \phantom{xx}N-(CH_2)_{\overline{n}}-Si-Y, \\ \diagup \phantom{xxxxxxxxx} \diagdown \\ R'' \phantom{xxxxxxxxxx} Z \end{array} \quad (III)$$

wherein $R_1$ represents an alkyl group containing 1 to 4 carbon atoms.

3. The polyurethane composition of claim 1 wherein component A) comprises an alkoxysilane-functional polyurethane containing terminal groups corresponding to formula (I) wherein X, Y and Z represent methoxy groups.

4. The polyurethane composition of claim 2 wherein component A) comprises an alkoxysilane-functional polyurethane containing terminal groups corresponding to formula (I) wherein X, Y and Z represent methoxy groups.

5. The polyurethane composition of claim 1 wherein component D) comprises an aminosilane corresponding to formula (III) wherein R" represents an aminoethyl group, n is 3 and X, Y and Z represent methoxy or ethoxy radicals.

6. The polyurethane composition of claim 2 wherein component D) comprises an aminosilane corresponding to formula (III) wherein R" represents an aminoethyl group, n is 3 and X, Y and Z represent methoxy or ethoxy radicals.

7. The polyurethane composition of claim 3 wherein component D) comprises an aminosilane corresponding to formula (III) wherein R" represents an aminoethyl group, n is 3 and X, Y and Z represent methoxy or ethoxy radicals.

8. The polyurethane composition of claim 4 wherein component D) comprises an aminosilane corresponding to formula (III) wherein R" represents an aminoethyl group, n is 3 and X, Y and Z represent methoxy or ethoxy radicals.

9. A method of producing the polyurethane composition of claim 1 which comprises mixing components A), B), C) and E) with the exclusion of moisture and subsequently adding component D).

10. A sealant, adhesive or coating composition containing the polyurethane composition of claim 1.

* * * * *